United States Patent
Dube

(10) Patent No.: US 11,648,826 B2
(45) Date of Patent: May 16, 2023

(54) BOAT VENTILATION SYSTEM

(71) Applicant: Veralex Inc., Princeville (CA)

(72) Inventor: Simon Dube, Quebec (CA)

(73) Assignee: Veralex Inc., Princeville (CA)

( * ) Notice: Subject to any disclaimer, the term of this patent is extended or adjusted under 35 U.S.C. 154(b) by 1034 days.

(21) Appl. No.: 16/251,881

(22) Filed: Jan. 18, 2019

(65) Prior Publication Data

US 2019/0225058 A1 Jul. 25, 2019

Related U.S. Application Data

(60) Provisional application No. 62/619,426, filed on Jan. 19, 2018.

(51) Int. Cl.
| | |
|---|---|
| *B60J 1/06* | (2006.01) |
| *B63J 2/04* | (2006.01) |
| *B63J 2/10* | (2006.01) |
| *B63B 19/04* | (2006.01) |
| *B63B 19/02* | (2006.01) |

(52) U.S. Cl.
CPC ................. *B60J 1/06* (2013.01); *B63B 19/04* (2013.01); *B63J 2/04* (2013.01); *B63J 2/10* (2013.01); *B63B 19/02* (2013.01)

(58) Field of Classification Search
CPC .... B63J 2/10; B63J 2/04; B63B 19/04; B63B 19/02; B60J 1/06
See application file for complete search history.

(56) References Cited

U.S. PATENT DOCUMENTS

| | | | |
|---|---|---|---|
| D331,560 S | 12/1992 | Ivey | |
| 6,585,582 B1 * | 7/2003 | Ziegler | ................. F24F 13/084 454/118 |
| D555,070 S | 11/2007 | Bach | |
| 2008/0245288 A1 * | 10/2008 | Bach | ....................... B63B 17/02 114/361 |
| 2009/0211512 A1 * | 8/2009 | Mason | ................... B60H 1/267 114/361 |
| 2012/0122387 A1 * | 5/2012 | Nicola | ................. B60H 1/3428 454/155 |

* cited by examiner

*Primary Examiner* — Schyler S Sanks
(74) *Attorney, Agent, or Firm* — PCFB LLC

(57) ABSTRACT

There is described a ventilation system for a boat. The windshield body comprises an air scoop in a bottom portion of the windshield body, facing a forward direction of the boat for air entry, the air scoop having an entry which is substantially horizontal and the air scoop extending upwardly within the windshield body to form a conduit having an upward component. The conduit end opens toward an inside of the boat, at a location higher than the entry of the air scoop. A hingeable vent can be installed on the opening inside the boat to be open or closed. The vent may also be sued with a direct opening with the outside. In this case, flaps can be installed in the opening. The flaps can be hingeable about their own respective hinge axis, and move together using a solid link. The flaps may be used without the vent.

14 Claims, 17 Drawing Sheets

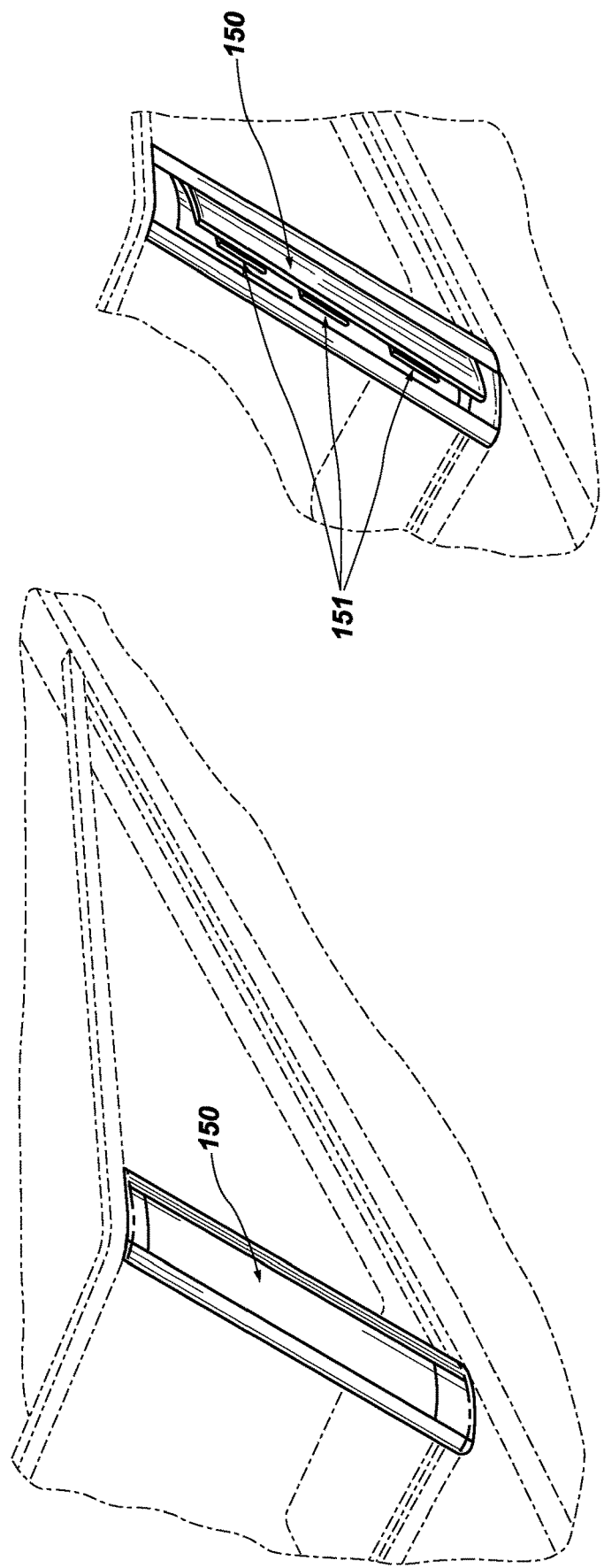

BOAT VENTILATION SYSTEM

CROSS-REFERENCE TO RELATED APPLICATIONS

This application claims benefit of U.S. provisional patent application 62/619,426, filed Jan. 19, 2018, the specification of which is hereby incorporated herein by reference in its entirety.

BACKGROUND

(a) Field

The subject matter disclosed generally relates to boat windshields. More specifically, it relates to ventilation on a boat.

(b) Related Prior Art

A boat usually includes a hull having a bow and a stern. Above the bow there is usually a foredeck that connects between the gunwale and the windshield. Other configurations include a frontward passenger area instead of the foredeck. Behind the windshield there is a pilot station and possibly a rearward passenger area.

In either cases, the windshield is provided in front of the pilot station and/or the rearward passenger area. The windshield shields the rearward passenger area and the pilot station from the wind when the boat is moving on the water.

However, it is often desired to feel the wind in these areas while the boat is moving, especially when a roof is provided above the windshield, to improve user experience and increase pleasure when navigating. This desire to feel the wind should not be confused with the absence of windshield, since such an absence would probably imply too much wind.

Attempts have been made to ventilate the pilot station and the rearward passenger area of the boat using the wind generated by the movement of the boat, while keeping the windshield.

For example, as shown in FIGS. 1 and 2, US Design Patent No. D331560 describes a corner post 150 that opens and closes to provide access to a plurality of openings 151 that allow the wind to enter through the post toward the inside of the boat to ventilate the pilot station. FIG. 1 illustrates a conventional design of a corner post 150 of a windshield in closed position, and FIG. 2 illustrates the design of FIG. 1 wherein the corner post 150 is in open position to provide access to the openings 151 provided in the post.

Another attempt is shown in US Design Patent No. D555070 which describes a plurality of openings 152 provided in the corner of the boat windshield as shown in FIG. 3 and which allow the wind to go through when the boat is moving.

SUMMARY

The present embodiments describe such a system. There is described a ventilation system for a boat. The windshield body comprises an air scoop in a bottom portion of the windshield body, facing a forward direction of the boat for air entry, the air scoop having an entry which is substantially horizontal and the air scoop extending upwardly within the windshield body to form a conduit having an upward component. The conduit end opens toward an inside of the boat, at a location higher than the entry of the air scoop. A hingeable vent can be installed on the opening inside the boat to be open or closed. The vent may also be sued with a direct opening with the outside. In this case, flaps can be installed in the opening. The flaps can be hingeable about their own respective hinge axis, and move together using a solid link. The flaps may be used without the vent.

In embodiments there is disclosed a ventilation system for a boat for allowing the wind to flow in the pilot station of the boat behind the windshield. In an embodiment, the ventilation system is embedded within the windshield and comprises an air scoop provided at an outside surface of the windshield for scooping air produced by the forward motion of the boat. The air scoop may be shaped and dimensioned to allow the air scooped by it to circulate upward in a conduit to then be released in the area behind the windshield (pilot station/pilot cabin). In a non-limiting example of implementation, the air scoop is preferably provided at or in proximity of a lower edge of the windshield. This configuration removes water drizzles from the wind as it moves upward and reduces/eliminates the noise that the wind makes when being scooped and directed toward the air outlet.

In one aspect, there is provided a windshield for a watercraft comprising: a body of transparent material adapted for installing on an upper surface of the watercraft, and a ventilation system for ventilating an area behind the windshield.

The ventilation system comprises: an external air scoop provided at or near a lower edge of the windshield for scooping a wind generated by a forward movement of the watercraft; an air conduit in fluid communication with the air scoop at a lower end thereof; an air outlet in fluid communication with the air conduit at an upper end of the air conduit, the air outlet being configured for discharging the wind circulating in the conduit toward the area behind the windshield.

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature, and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which:

FIG. 1 illustrates a conventional design of a corner post of a windshield in closed position;

FIG. 2 illustrates the design of FIG. 1 wherein the corner post 150 is in open position;

It will be noted that throughout the appended drawings, like features are identified by like reference numerals.

DETAILED DESCRIPTION

Boat windshield designs found in the prior art were discussed above. By using such prior art windshield designs, several flaws were found with these designs. The first problem is that these designs do not prevent the water splashing onto the windshield from entering into pilot station. Water splashes and droplets can indeed find their way through the openings which are provided on the corner posts and penetrate into the pilot station. This is bothering and prevents full enjoyment of the system of the prior art.

Another problem is the whistling noise that these openings make as the boat is moving. By using the prior art designs, it appears that this noise is mainly due to the fact that the windshield is provided at a certain angle with respect to the foredeck for reducing air resistance. At the same time, the direction of movement of the boat is horizontal, whereby the wind penetrates the openings at an acute angle and causes a whistling noise.

The fact that multiple openings are provided and the fact that some of these openings have different dimensions makes the problem worse and generates noises at different frequencies making the ride too noisy to ignore. The level and magnitude of this noise also increase as the boat speed increases making the experience less and less enjoyable.

Considering all these drawbacks from the discussed prior art designs, it follows that there remains a need for an improved windshield ventilation system that overcomes these problems while allowing the advantages of reasonable wind penetration into the pilot cabin for the passengers to enjoy the feeling of the breeze during navigation while being protected from strong winds and water splashes by the windshield.

Figure 3:
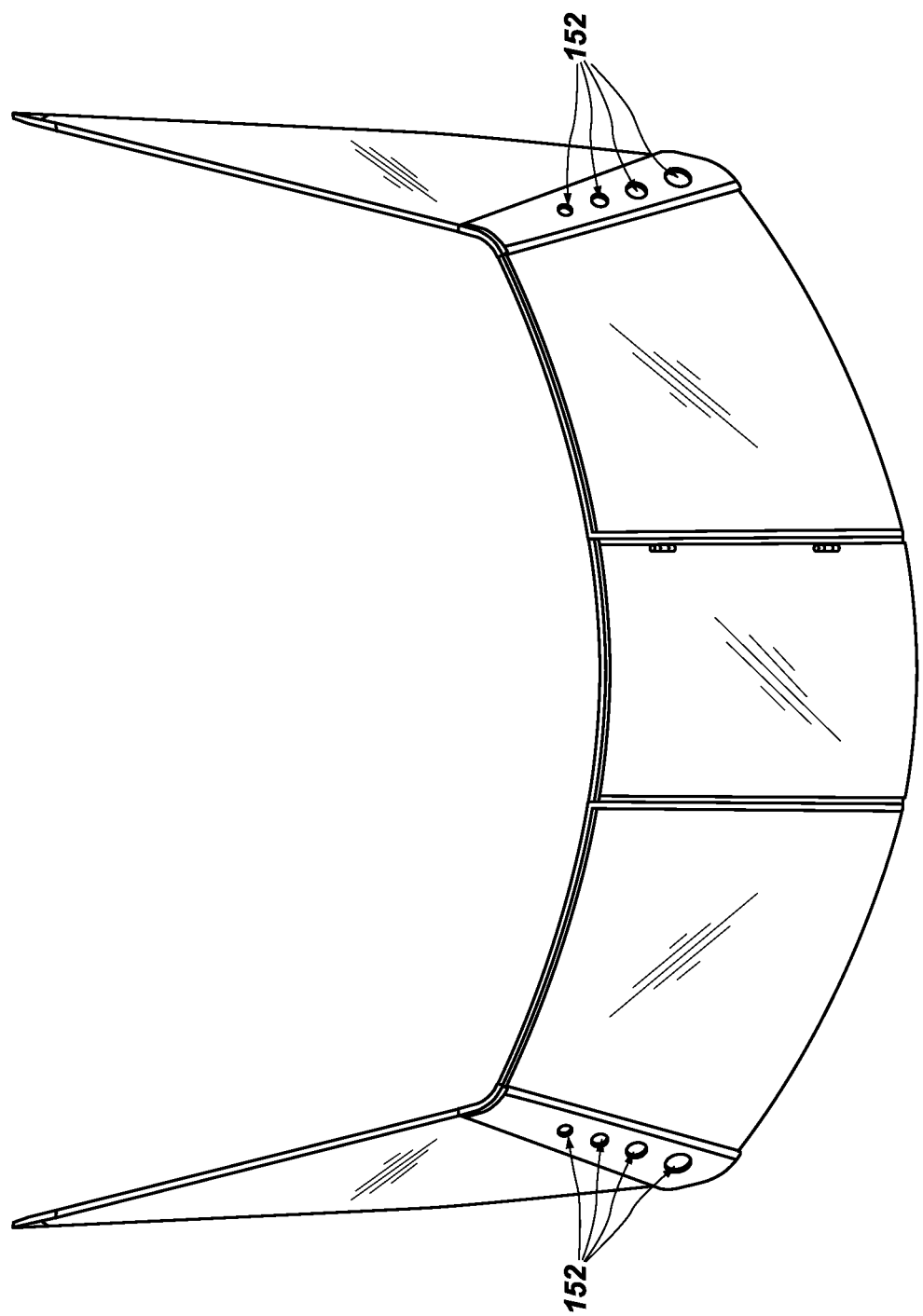
FIG. 3 illustrates another conventional design of a boat windshield having openings in the corner post thereof.
Figure 4:
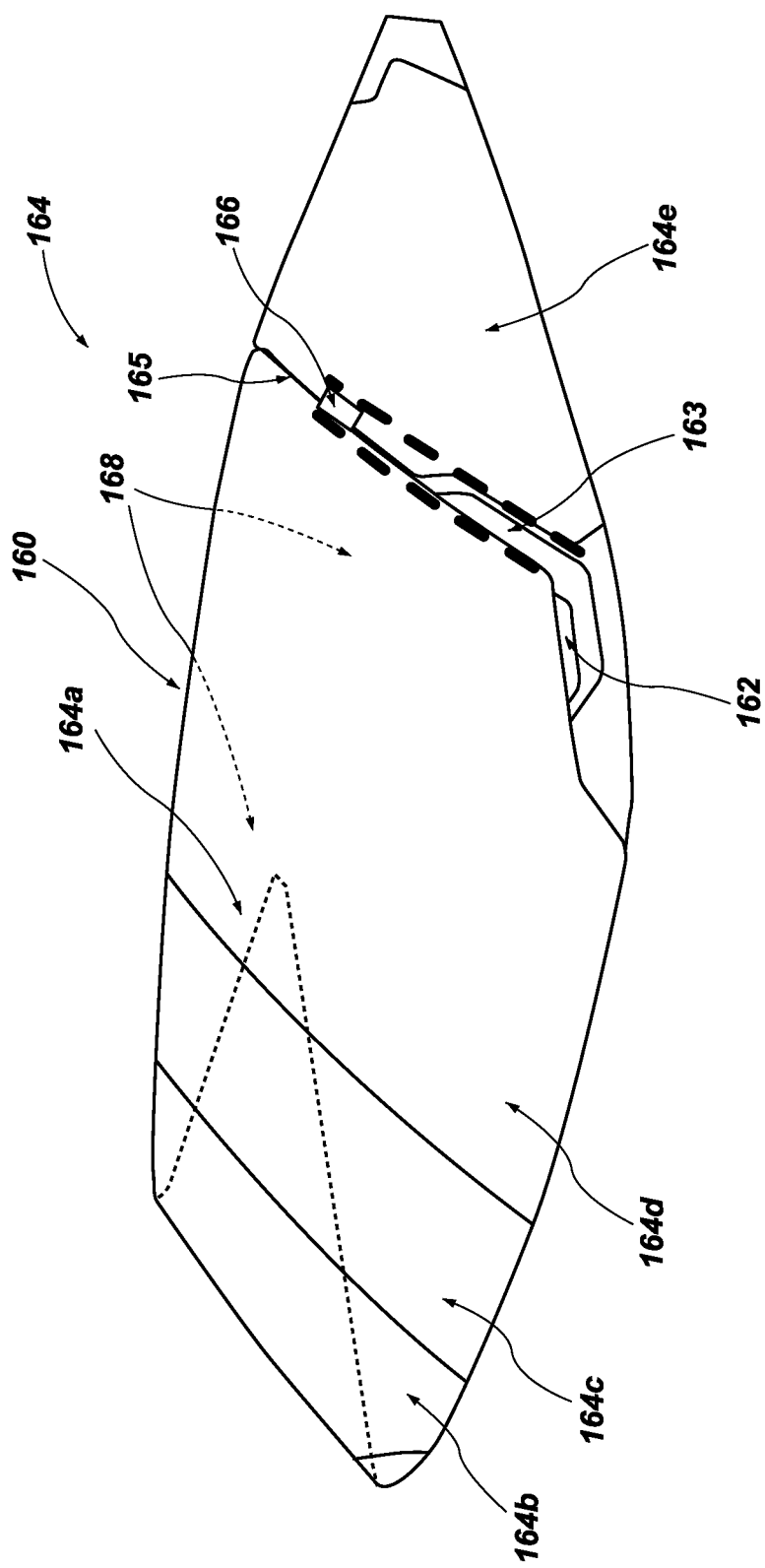
FIG. 4 illustrates an example of a boat windshield having embedded therein a ventilation system, in accordance with an embodiment.

Referring now to the drawings, and more particularly to FIG. 4, there is illustrated an example of a boat windshield 160 having embedded therein a ventilation system, in accordance with an embodiment. As shown in the exemplary embodiment of FIG. 4, an air scoop 162 is provided at the lower edge of the windshield 160 in proximity of the foredeck (not shown). The wind that is scooped by the air scoop 162 due to the forward motion of the boat is directed through a conduit 163 until the wind arrives at and gets released through the air outlet 166 provided in the pilot station 168 behind (on the inside of) the windshield 160.

In a non-limiting example of implementation, the air scoop 162 and the conduit 163 may be arranged to cause an upward movement of the air within the conduit 163 prior to its release. The conduit 163 may be in a fluid connection with the external air scoop 162 at a lower end thereof and with the internal air outlet 166 at the second end thereof opposite the first end. By having the second end of the conduit 163 located at a position which is higher than the first end thereof, the conduit 163 forces incoming air, including eventual water droplets, to undergo a movement having a significant upward component. This upward movement of air through the conduit 163 can prevent water droplets from actually reaching the second, upper end of the conduit 163. The conduit 163 has an upward inclination which filters the water droplets, which impact the floor of the conduit 163 and drips down backward. This allows for removing water drops/drizzles that may have splashed onto the windshield prior to releasing the fresh air in the pilot station. The water droplets may therefore never reach the pilot cabin.

The configuration comprising the conduit 163 also allows to reduce/eliminate the noise. Otherwise, as in the prior art designs discussed above, such noise is caused by the direct flow of air through holes provided in the windshield. If the air circulates in the conduit 163 prior to being released, the whistling noise is reduced or practically eliminated.

The conduit 163 is preferably provided on the inside (the side facing the pilot station) of the windshield 160 to not affect the aerodynamics of the boat. The conduit 163 is preferably oriented upward following or substantially following the elevation angle of the windshield. In a less preferred embodiment, it is also possible to provide the conduit 163 externally on the outside of the windshield 160.

In embodiments, the windshield may be made of several sections 164a-164e which are secured beside each other and possibly attached to each other along a joint section 165 as exemplified in FIG. 4. In an embodiment, the conduit 163 is preferably provided/glued/fixed/secured to the windshield 160 at the joint section 165 between two different and adjacent windshield sections 164.

Figure 5:
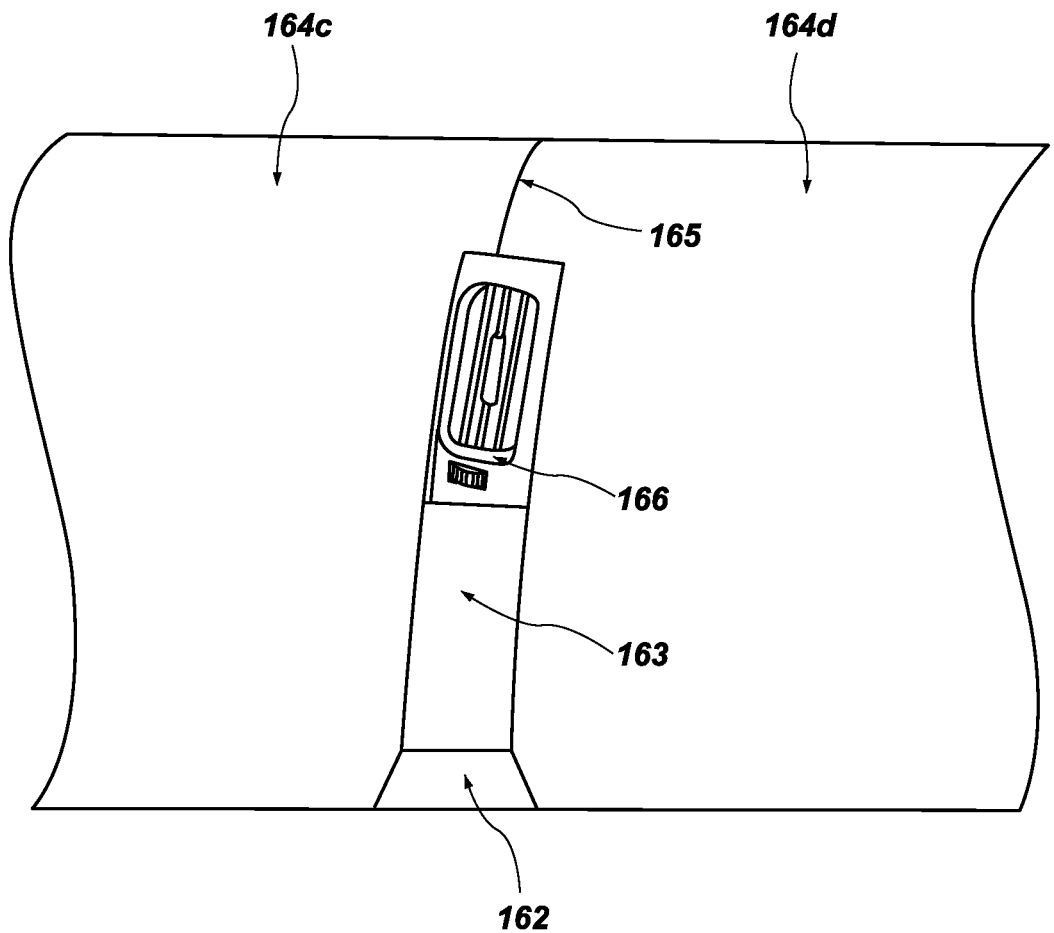
FIG. 5 illustrates a non-limiting example of an air outlet shown from the pilot station behind the windshield.

As discussed above, an air outlet is provided on the inner sider of the windshield, toward the pilot station, and is operably connected to the upper end of the conduit 163 to release the fresh air within the cabin. According to an embodiment, the air outlet may be configured to open and close and to orient the air in a specific direction much like existing air outlets provided in vehicles. FIG. 5 illustrates a non-limiting example of an air outlet 166 shown from the interior of the pilot station behind the windshield. As exemplified in FIG. 5, the air outlet/vent 166 is in fluid communication with the conduit 163 which in turn is in fluid communication with the external air scoop 162.

While preferred embodiments have been described above and illustrated in the accompanying drawings, it will be evident to those skilled in the art that modifications may be made without departing from this disclosure. Such modifications are considered as possible variants comprised in the scope of the disclosure.

Figure 6:
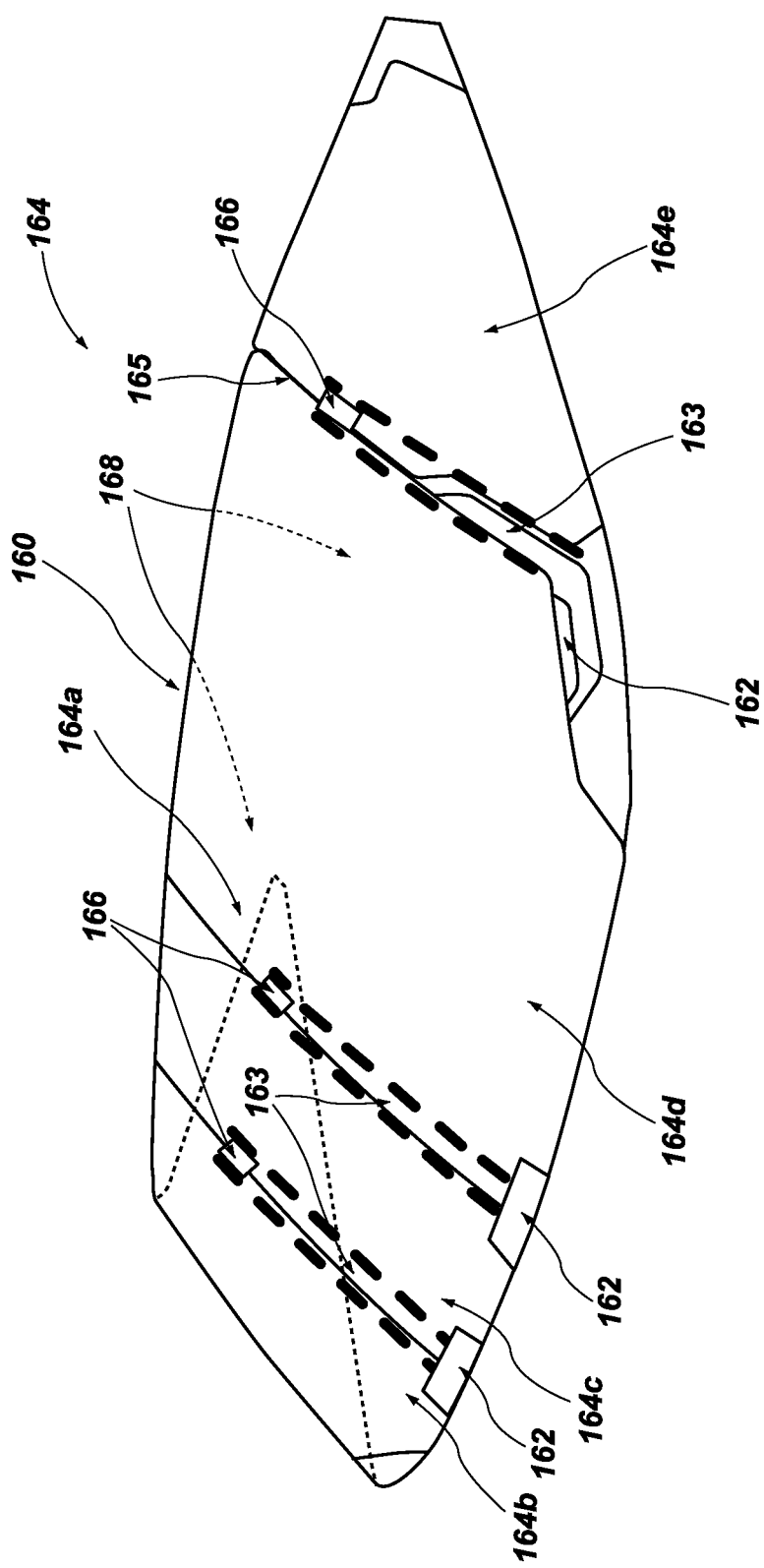
FIG. 6 illustrates an example of a boat windshield having embedded therein multiple ventilation systems, in accordance with another embodiment.

For example, although FIG. 4 shows only a single ventilation system between sections 164d and 164e of the windshield, the embodiments are not limited to this configuration. Numerous ventilation systems (i.e., more than one) may be provided throughout the windshield, as shown in FIG. 6 which illustrates, in accordance with another embodiment, a plurality of air scoops 162 connected to a plurality of air conduits 163 to discharge the air through a plurality of air vents 166.

Now referring to FIGS. 7-13, there is shown another embodiment of the ventilation system comprising a vent 200.

According to an embodiment, the vent 200 may be the actual implementation of the diffusing mechanism of the air outlet 166 of the embodiment described above in reference with FIG. 4 or 6, with the same conduit 163 or a similar embodiment. In other words, the vent 200 can replace the diffusing mechanism of the air outlet 166 such as the one shown in FIG. 5.

According to another embodiment, the vent 200 is provided as an air outlet of another type of ventilation system.

In FIGS. 7-13, the ventilation system is shown in a manner similar to FIG. 4 or 6, except that the air outlet 166 at the upper end of the conduit 163 is shown to be at a lower position when compared with FIG. 4. The L-shape of the air scoop 162 (horizontal then upward vertical), and the upward direction of the conduit 163 afterwards, can be sufficient to remove water droplets, as discussed above. Therefore, the conduit 163 does not need to be as long as indicated in FIG. 4 where the upper end of the conduit 163 is shown to be very high.

Figure 7:
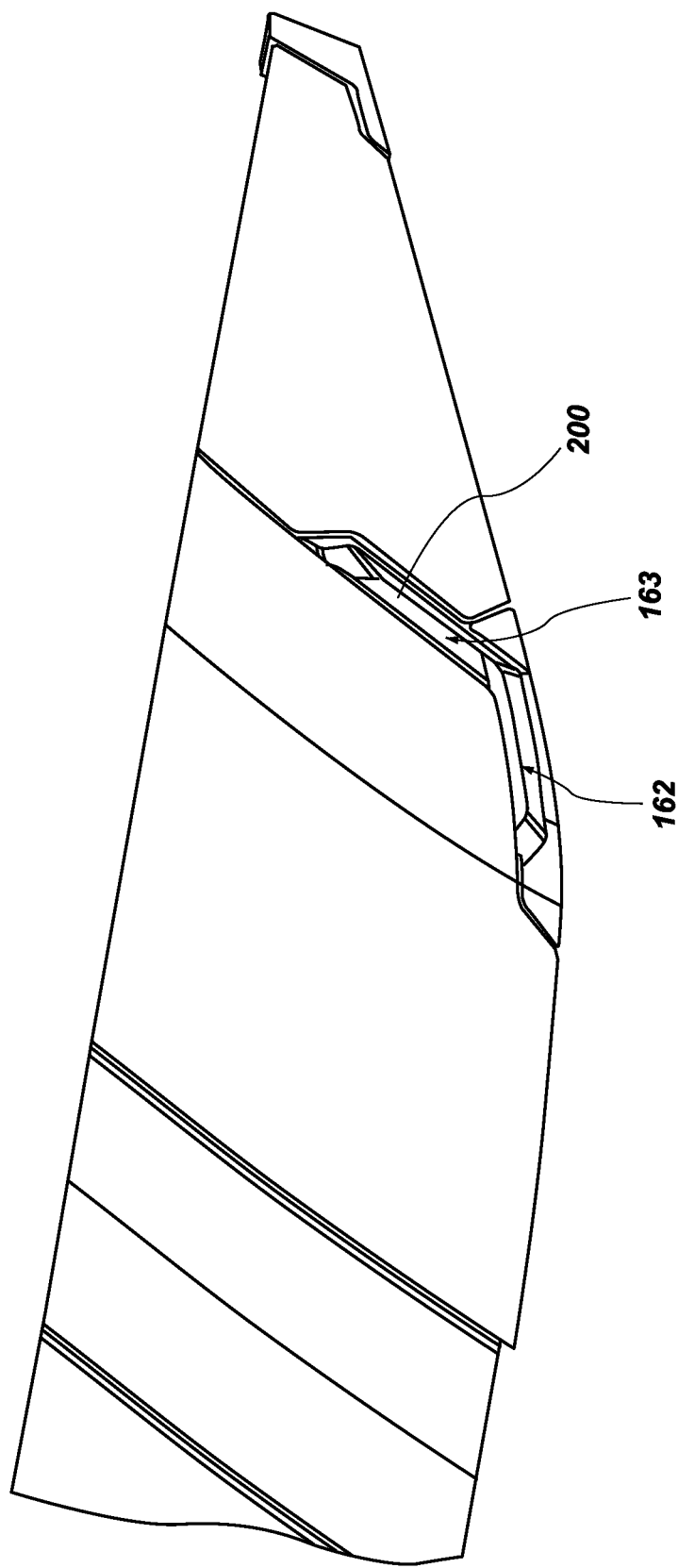
FIG. 7 is an outside perspective view illustrating an example of a boat windshield comprising a ventilation system having a vent, in accordance with an embodiment.

Such a ventilation system shown in FIGS. 7-13, and more specifically in FIG. 7, comprises a conduit 163 which also has a significant vertical component (upwardly), as discussed above, but is simply shorter. The air scoop 162 acts as an entry which is substantially horizontal in the entry and then turns upwardly, forming a L-shaped channel entry toward the conduit 163. The conduit 163 is shown to be short but to have a significant vertical component. The conduit 163 ends at the vent 200, which is located at the inside of the boat windshield, toward the pilot station for example, at a location higher than the air scoop 162 from which the conduit 163 extends.

Figure 8:
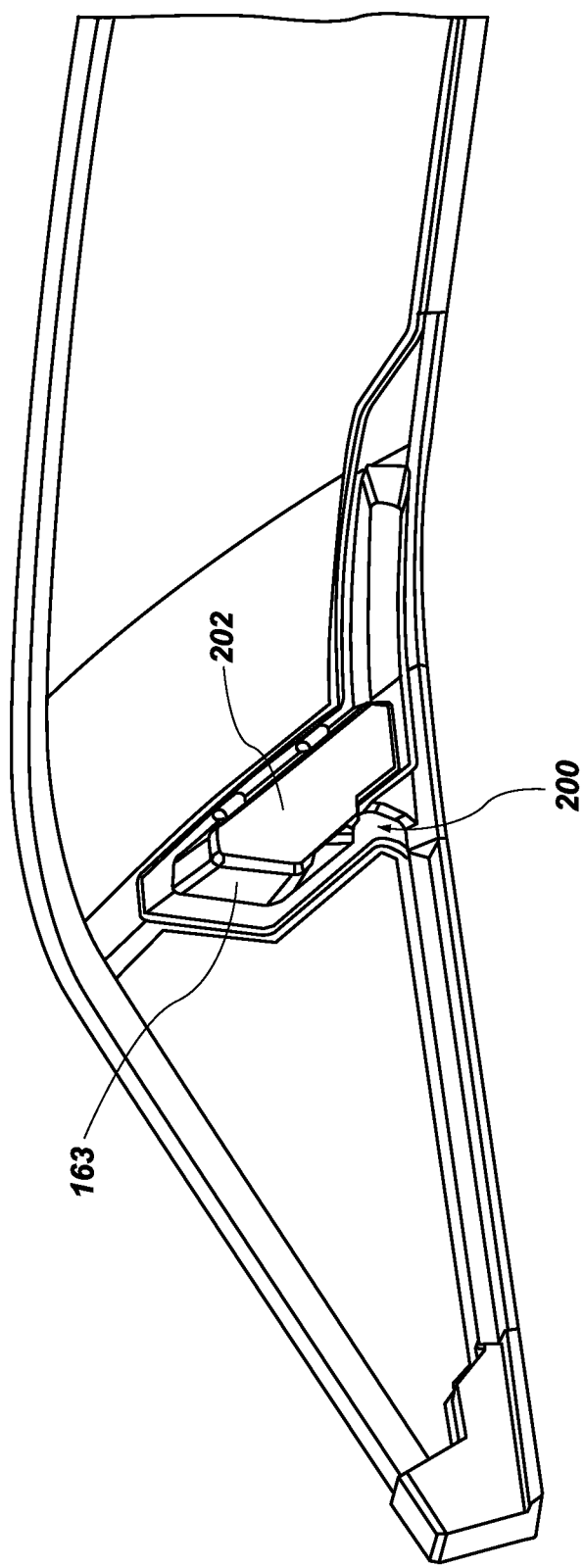
FIG. 8 is an inside perspective view illustrating the boat windshield of FIG. 7.

FIG. 8 illustrates the vent 200 from the inside. It can be seen that the conduit 163, in addition its vertical component, also has a significant depth toward the inside of the boat windshield. At the innermost portion of the conduit, the vent 200 is provided and its body 202 covers the whole air outlet 166 and thereby acts as a cap, when in closed position.

Figure 9:
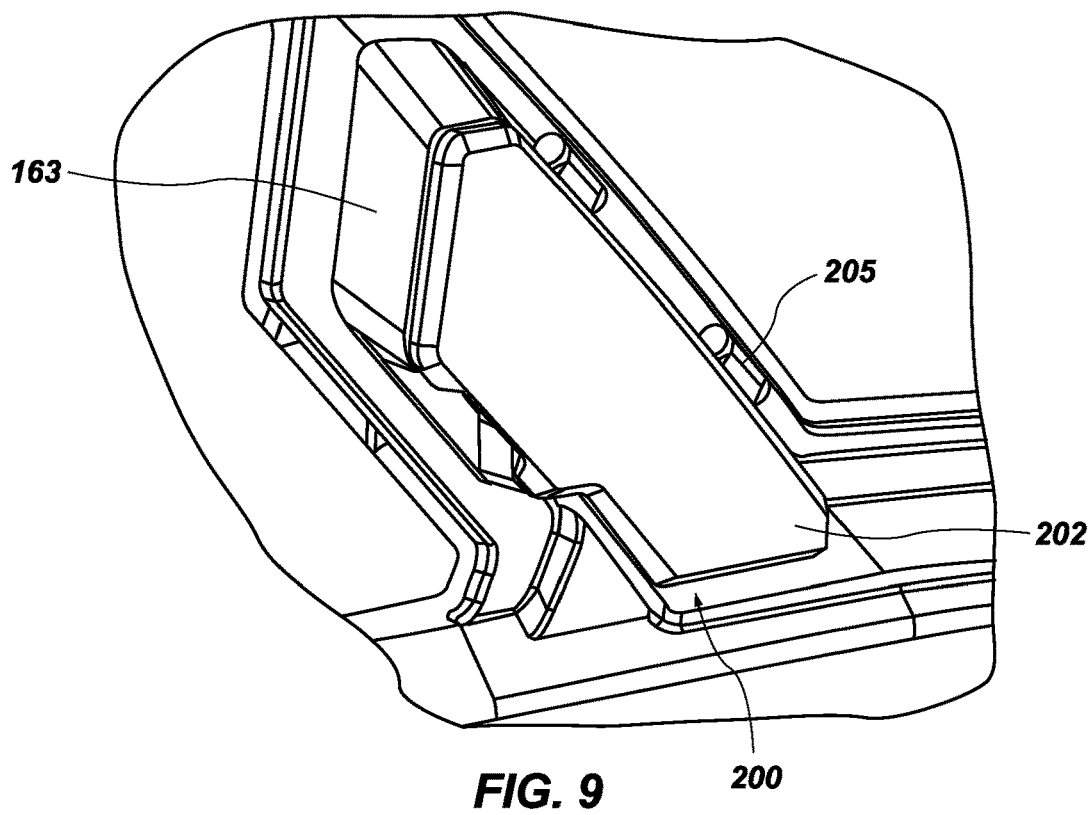
FIGS. 9 and 10 are inside perspective views illustrating the vent being closed and removed, respectively, in accordance with an embodiment.

FIG. 9 illustrates that a hinge 205 can be installed. The hinge is used such that the body 202 of the vent 200 can be hinged away from the air outlet 166 of the conduit 163.

Figure 10:
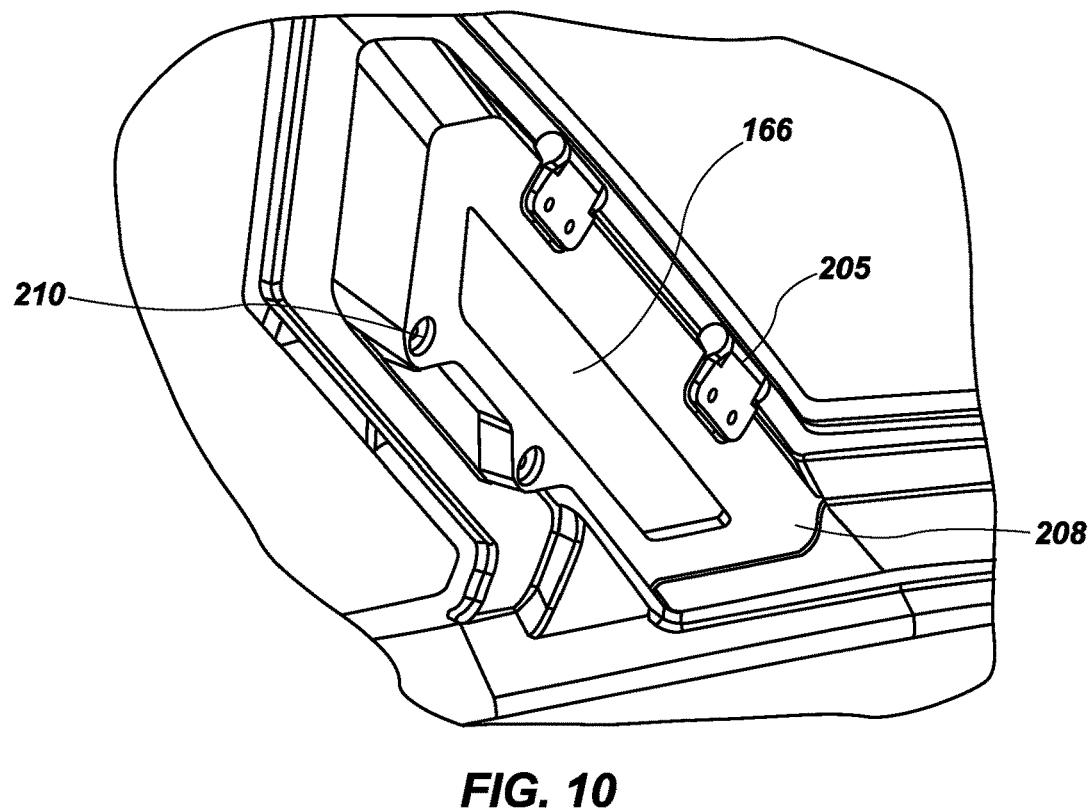

For example, FIG. 10 illustrates the mechanism beneath the body 202. A vent receptacle 208 is provided on the contour of the air outlet 166. According to an embodiment, the vent receptacle 208 defines an attachment 210 onto which the body 202 can be attached, either by being clipped thereinto using a clip element, or be attached using a string having a node which can be inserted through the attachment 210.

Figure 11:
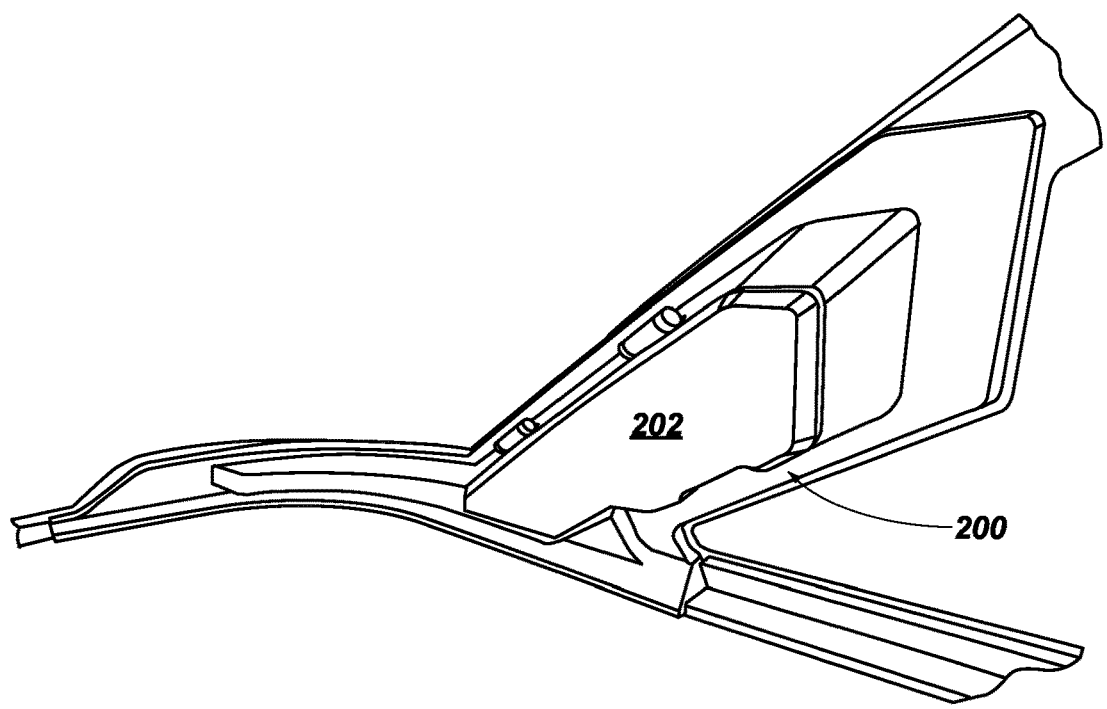
FIGS. 11, 12 and 13 are pictures illustrating, from the inside, an example of a boat windshield comprising a vent being closed, partially open, and completely open, respectively, in accordance with an embodiment.
Figure 12:
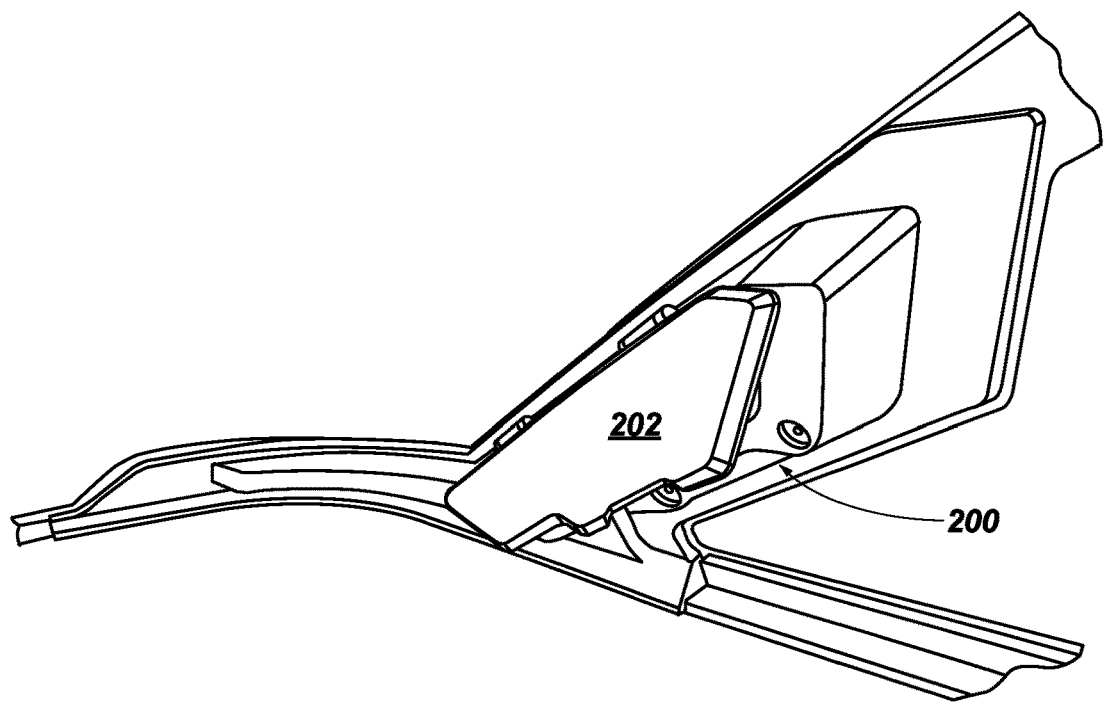
Figure 13:
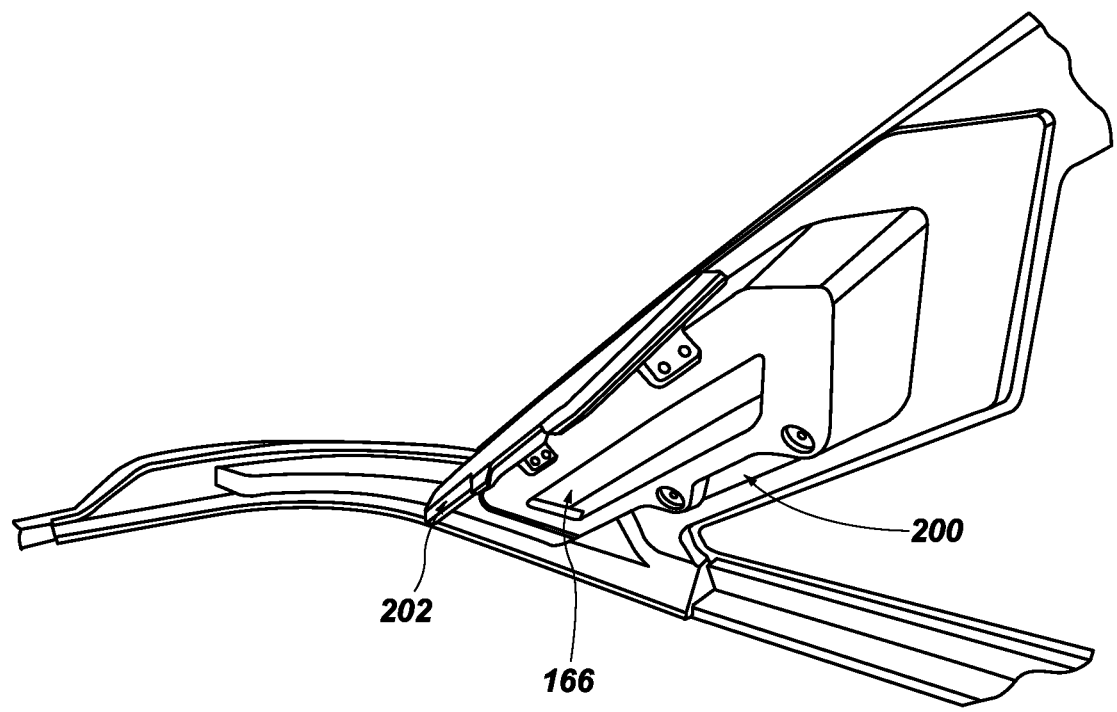

FIG. 11 is a picture showing the vent 200 being closed onto the air outlet 166. FIG. 12 is a picture showing the vent body 202 being slightly hinged away from the air outlet 166 to leave a passage for the wind through the conduit 163. FIG. 13 is a picture showing the hinge being completely open and allowing a completely free passage of the wind through the conduit 163.

The embodiment of FIG. 13 shows that the conduit 163 has its air outlet 166 extend on a long distance vertically, instead of being only a small hole or aperture. This ensures that there is no whistling made by the wind through the air outlet 166.

The air outlet 166 therefore extends from a bottom end to a top end. As described above, the bottom end of the air outlet 166 should be located at a position higher than the air entry into the air scoop 162. However, as shown in FIG. 13, there conduit 2163 can be very large and be open, on its outer side, to the outside. Therefore, the conduit 163 may be accessible directly from the outside without having to pass through the air scoop 162. In this particular case, the vent 200 acts as a water stopper and should be only partially open to allow the body 202 to block incoming water droplets. The large size of the conduit 163 reduces the whistling noise.

Now referring to FIGS. 14-22, there is shown a ventilation system comprising flaps. The flaps can be provided on a ventilation system as described in relation with FIGS. 4-6, or on a ventilation system as described in relation with FIGS. 7-13, or on another type of ventilation system, such as a simple opening, as shown in FIGS. 14-22.

Figure 14:
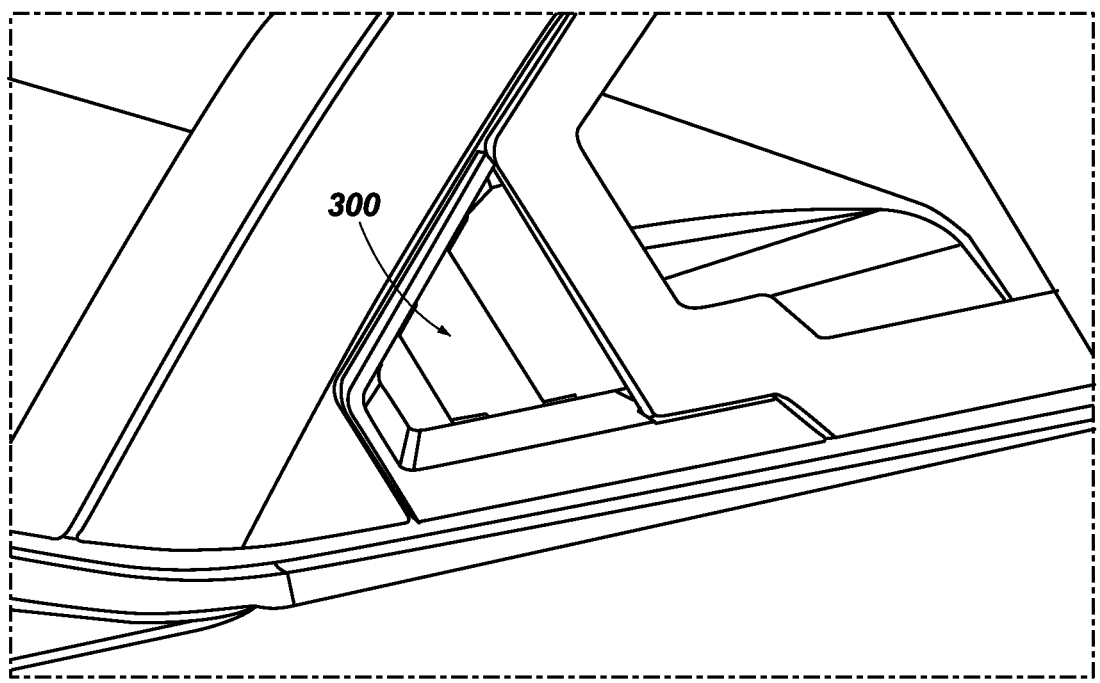
FIGS. 14 and 15 are an outside perspective view and an inside perspective view, respectively, illustrating an example of a boat windshield comprising a ventilation system having flaps, in accordance with an embodiment.
Figure 15:
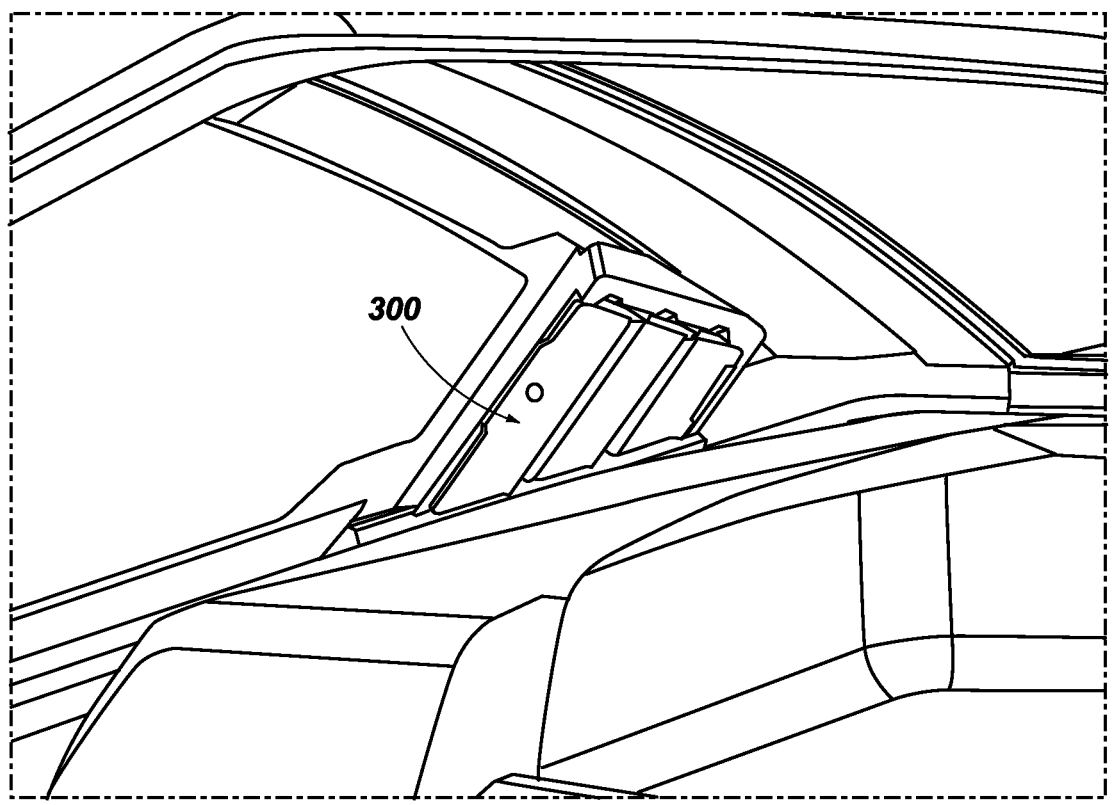

FIG. 14 shows an opening made in the frame of the windshield, such as in the corner. FIG. 15 is the inside view of the same embodiment. In the embodiment of FIG. 14, there is no air scoop 162 acting as the entry, as in the previously described embodiment. Instead, the flaps 300 act as an air scoop.

Figure 16:
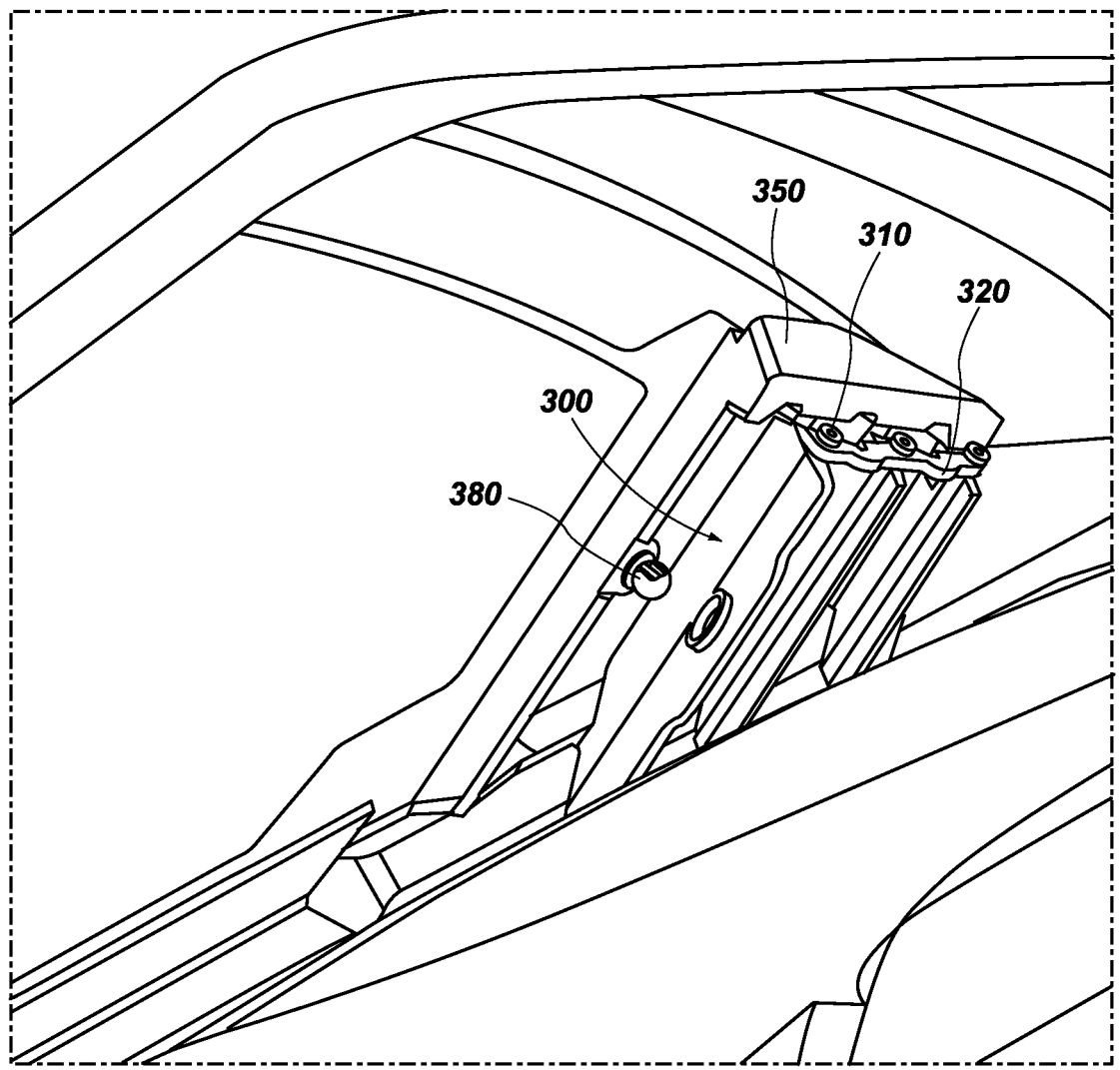
FIG. 16 is an inside perspective view illustrating open flaps, in accordance with an embodiment.

Indeed, as shown in FIG. 16, the flaps 300 are provided as a plurality of hard surfaces each being hingeable about its own flap hinge axis 310. Advantageously, a flap link 320 can be provided and link each of the adjacent flaps together (or at least two of them) such that they all undergo the same rotation movement, simultaneously, about their own respective flap hinge axis 310. The flap link 320 should be rigid, preferably a single piece of solid material, extending from a first one of the flaps to a last one of the flaps and being attached on an edge thereof. More than one link can be provided, for example on an upper part and on a lower part. FIG. 16 (or 18) shows a flap link 320 on an upper part of the flaps 300, linking them all together to ensure coordination of their movement. The solid material can be matel, and the link 320 can be laser cut for good precision of the shape.

Therefore, starting from the closed position, as shown in FIGS. 14-15, the flaps 300 can be opened, preferably simultaneously as described above. By being hinged about their own respective axis 310, each of the flaps 300 is given an orientation having a substantial component which is perpendicular to the boat surface, close to the corner post of the windshield side. By ensuring the the flaps are large enough, their surface will be brought outside, reaching a substantial distance away from the surface of the boat. This will redirect air into the opening inside which the flaps 300 are provided. Therefore, the flaps 300 are large enough to extend away from the surface onto which wind flows, thereby scooping air from this wind and brining it inside the boat.

Figure 17:
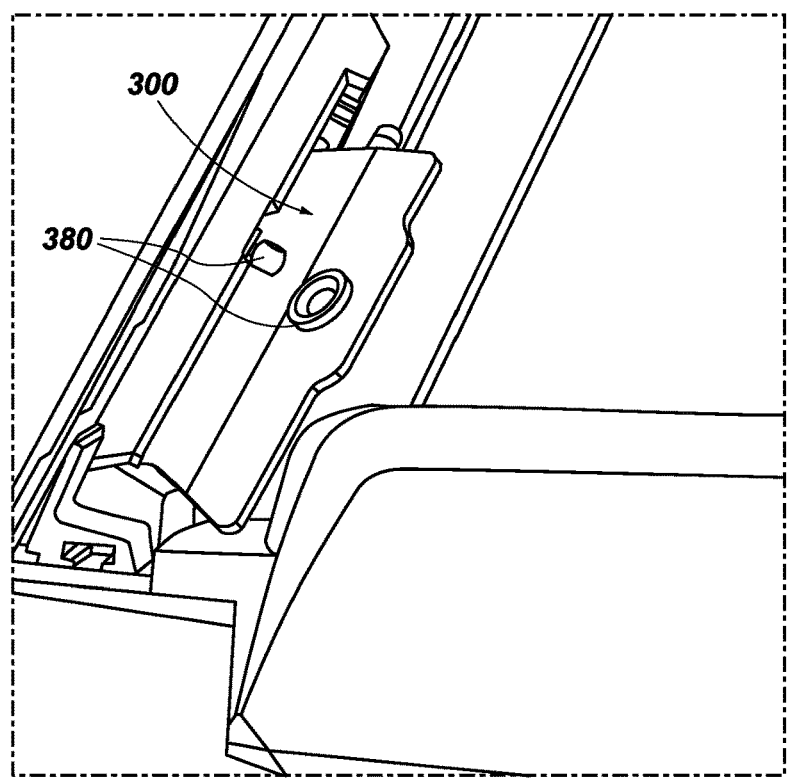
FIG. 17 is a side view of the vent of FIG. 16.
Figure 18:
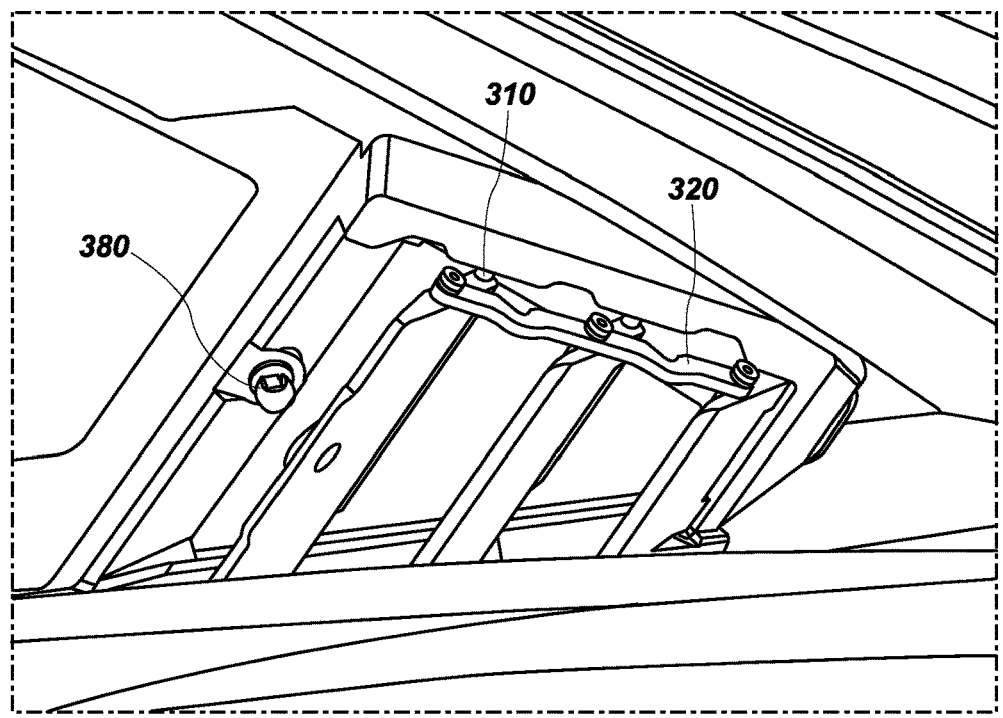
FIG. 18 is another inside view of the vent of FIG. 16.

In order to keep the flaps 300 closed, an attachment 380 can be provided, as shown in FIGS. 16-18. For example, a snap-fit connection system can be contemplated by having corresponding plunge and recess connect together in a snap-fit fashion. Otherwise, the attachment can be provided by having a string comprising a node, which can be inserted through a hole in a flap, for example, thus holding the attached flap in its closed position. For example, it can be a nylon pop-in grommet. Alternatively, a strong magnet can be contemplated. The flap link 320 ensures that the flaps 300 are all kept closed together even though only one flap comprises the attachment 380.

Figure 19:
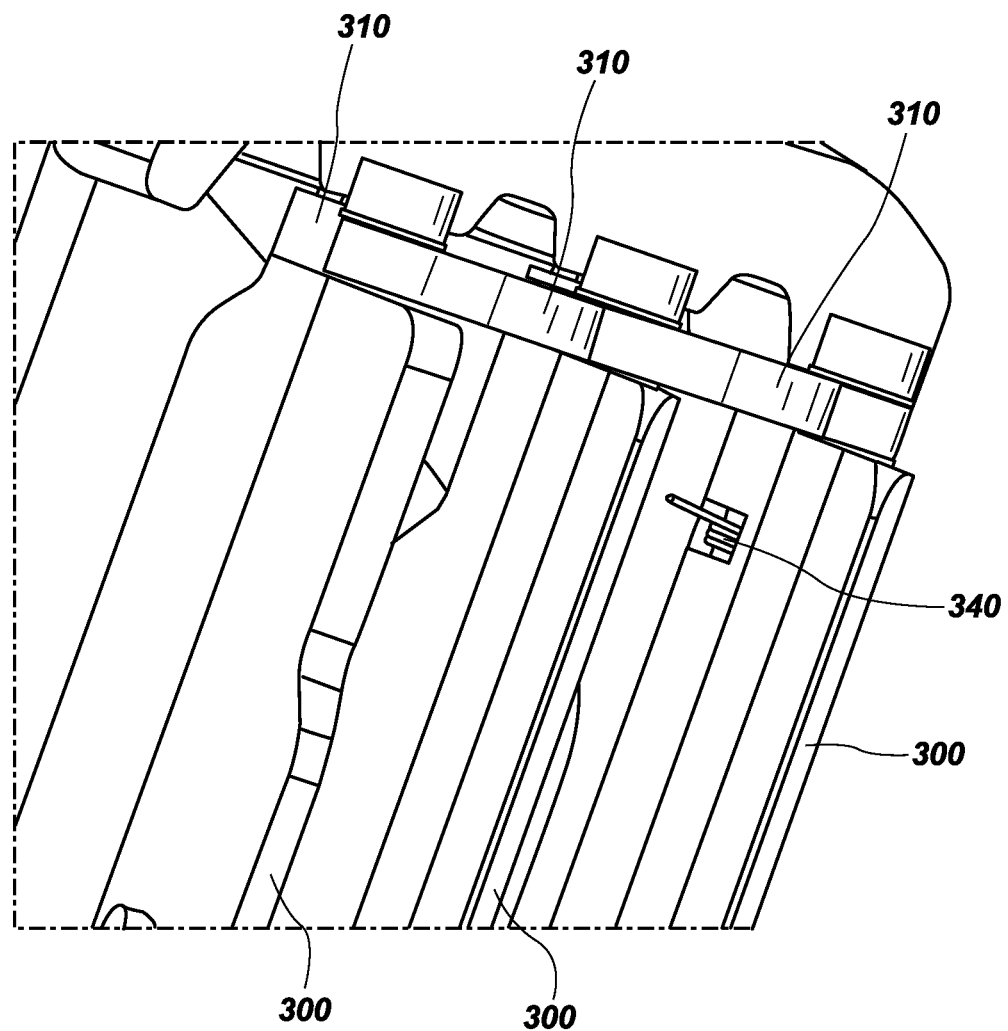
FIG. 19 is a front view illustrating open flaps having a torsion spring, in accordance with an embodiment.

In order to keep the flaps open when being in the wind (instead of being pushed to the closed position by strong winds), the flaps 300 can comprise a biasing means which ensures that they remain open and extend away from the boat surface to scoop the air. For example, as shown in FIG. 19, a torsion spring 340 can be added at the hinge axis of one of the flaps 300, holding it open when wind pressure is exerted and also maintaining the flap in a suitable orientation having a perpendicular component with respect to the boat surface, i.e., ensuring that the flap is not projected too far away from its closed position such as to be almost parallel with the wind. In order to undergo strong wind pressure, the flaps 300 can be made of a solid material. For example, they can be made of aluminum, in which case the flaps will be solid and keep their shape under wind pressure, while also have a light weight, which is advantageous when the flaps are being incorporated to the boat.

An angular displacement of the flaps 300 from the closed position (i.e., parallel with the surface, in the opening) greater than 20° or 30° would allow substantial wind scooping. An angle greater than 90° would imply that the flaps do not provide a guiding channel to the incoming wind; the flaps would stop scooping air. The torsion spring 340 or other biasing means can be used to avoid reaching such a position, and remaining in a more suitable angular position, such as the range between 20° and 90°, for example, or closer to 45°. The torsion spring 340 may need to be provided on a single flap and flap hinge axis connection, since the flap link 320 ensures that all flaps have the same behavior in terms of angular rotations. In replacement of the torsion spring 340, a friction hinge can be used, which creates friction in the connection with the hinge 310.

Figure 20:
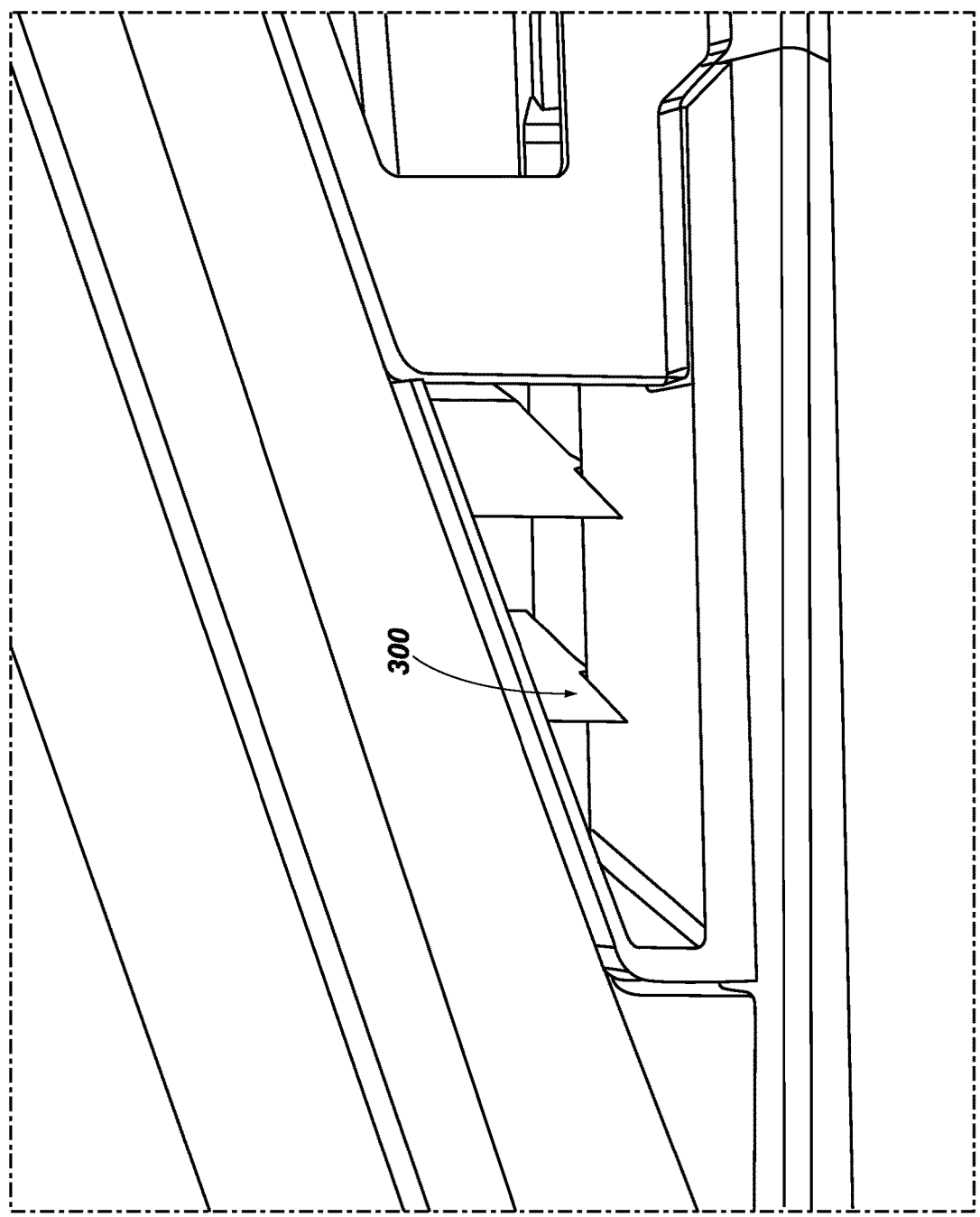
FIG. 20 is a front view illustrating the opening on the boat comprising open flaps, in accordance with an embodiment.

FIG. 20 illustrates the flaps having a significant perpendicular component with respect to the boat surface having been rotated about their hinges to be in an open position in which they can scoop the wind from the surface of the boat.

Figure 21:
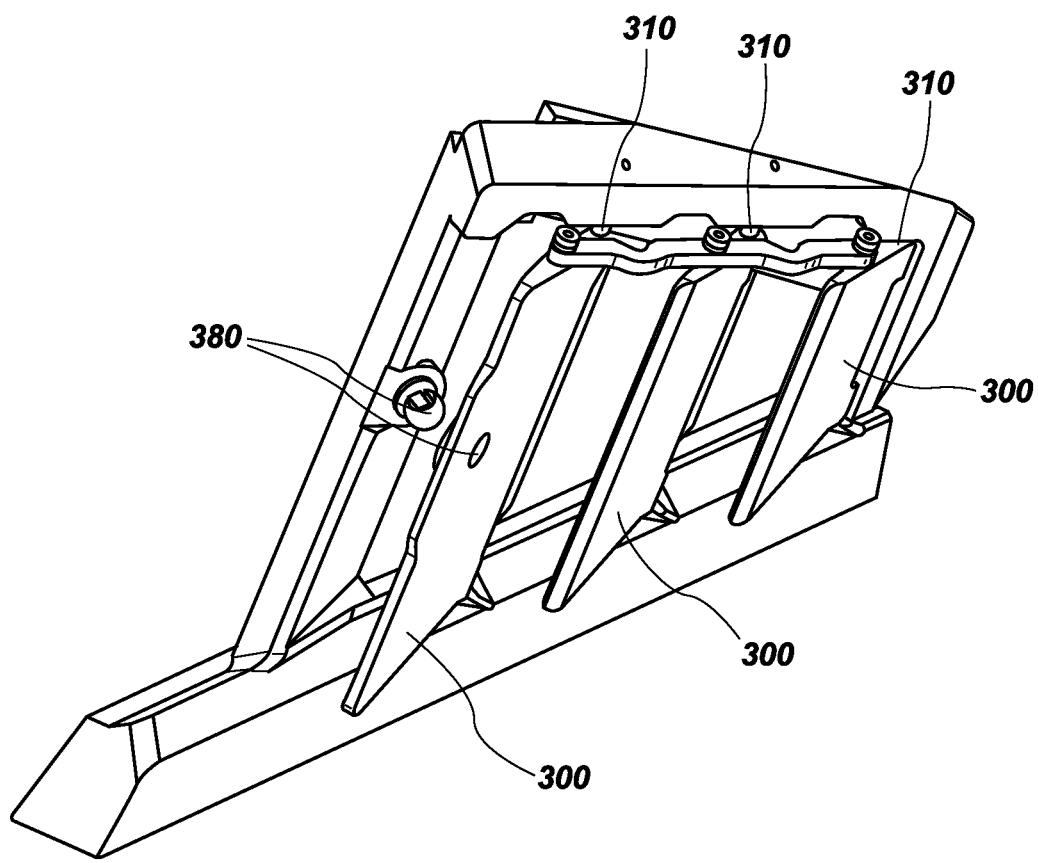
FIG. 21 is a perspective view illustrating the ventilation system, alone, comprising flaps, in accordance with an embodiment.

FIG. 21 illustrates in greater detail the flaps 300, their flap hinge axis 310, the flap link 320, and the flap attachment 380. The parts are held together, and secured to the opening of the boat windshield corner, using a flap system frame 350. The flap system frame 350 can be installed by being inserted into a suitable opening on a side or a corner of the windshield frame or body.

Figure 22:
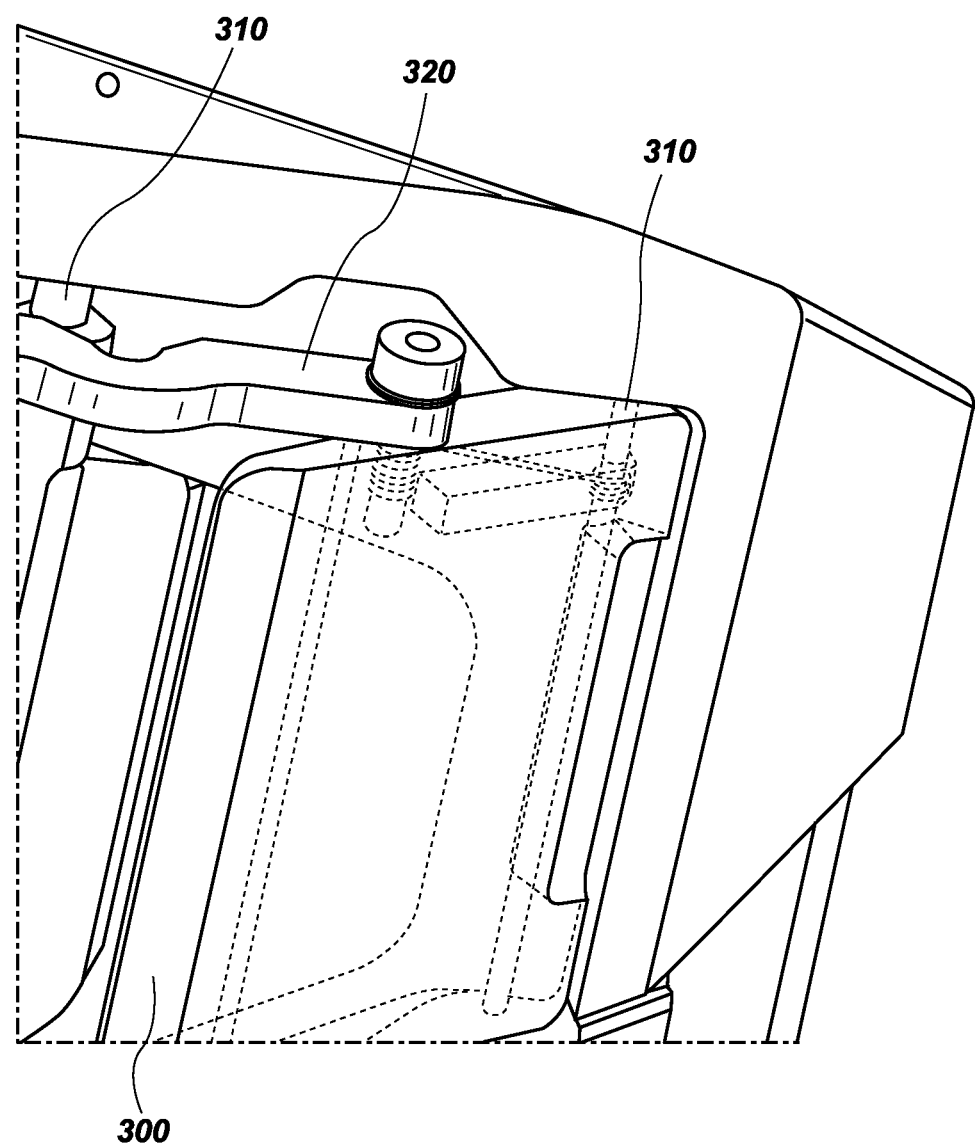
FIG. 22 is a transparent perspective view illustrating flaps about their hinge axis, in accordance with an embodiment.

FIG. 22 illustrates in greater detail the flaps 300, which have for example a pin or screw inserted therein from the flap link 320 to secure both parts together. The screw can be made of stainless steel, in combination with the aluminum flaps. Regarding the respective hinge axis 310 of a given flap, the hinge axis can be made of a rod being inserted through a base of the flap, about which the flap is free to rotate, thereby providing the hinge.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A ventilation system for a boat comprising
a windshield body comprising a frame forming a joint section between two different and adjacent windshield sections, the windshield body comprising an opening between an outside of the windshield body and an inside of the windshield body, in the frame forming the joint section;
a vent body for covering the opening on the inside, the vent body having a surface at least as large as the opening to act as a cap when the vent body is closed onto the opening; and
an air scoop at a bottom portion of the windshield body for air into said opening, the air scoop being formed within the frame forming the joint section, wherein the air scoop formed within the frame and said opening between the outside of the windshield body and the inside of the windshield body together extend upwardly inside the frame forming the joint section.

2. The ventilation system of claim 1, wherein the air scoop has an entry which is horizontal at the bottom portion of the windshield body.

3. The ventilation system of claim 2, wherein the opening for the vent body is provided at an end of the air scoop.

4. The ventilation system of claim 3, wherein the end of the air scoop is at a location completely higher than the entry of the air scoop.

5. The ventilation system of claim 2, wherein said opening is formed as a conduit starting from an end of the air scoop and extending within the in the frame forming the joint section with an upward component.

6. The ventilation system of claim 5, wherein the opening for the vent body is provided at an end of the conduit.

7. The ventilation system of claim 6, wherein the end of the conduit is located completely higher than the entry of the air scoop.

8. The ventilation system of claim 1, wherein the vent body comprises a hinge for opening or closing onto the opening, on the inside.

9. The ventilation system of claim 8, wherein a conduit is provided within the windshield body, the conduit extending in depth toward the inside of the windshield body.

10. The ventilation system of claim 9, wherein the ventilation system comprises a vent frame provided on a contour of the opening, further comprising an attachment in the vent frame.

11. The ventilation system of claim 1, wherein the opening between the outside of the windshield body and the inside of the windshield body comprises flaps extending away outwardly from the body for scooping air flowing on an outside surface of the windshield body.

12. The ventilation system of claim 11, further comprising a hinge axis for each one of the flaps, such that the flaps can individually hinge around a respective one of the hinge axis.

13. The ventilation system of claim 12, further comprising a link which is a solid piece of material attached to at least two of the flaps to ensure that the at least two of the flaps can hinge together and simultaneously.

14. A ventilation system for a boat comprising
a windshield body comprising a frame forming a joint section between two different and adjacent windshield sections, the windshield body comprising an air scoop in a bottom portion of the frame forming the joint section, facing a forward direction of the boat for air entry, the air scoop having an entry which is substantially horizontal and the air scoop extending upwardly to form a conduit within the frame forming the joint section and having an upward component;
a conduit end opening from the frame forming the joint section toward an inside of the boat, the conduit end being at an upper end of the conduit which is at a location completely higher than the entry of the air scoop.

* * * * *